United States Patent
Chiu

(10) Patent No.: US 8,164,317 B2
(45) Date of Patent: Apr. 24, 2012

(54) POWER SYSTEM WITH TEMPERATURE COMPENSATION CONTROL

(75) Inventor: Tzu-Huan Chiu, Chupei (TW)

(73) Assignee: Richtek Technology Corporation, Hsin-Chu (TW)

( * ) Notice: Subject to any disclaimer, the term of this patent is extended or adjusted under 35 U.S.C. 154(b) by 351 days.

(21) Appl. No.: 12/586,127

(22) Filed: Sep. 17, 2009

(65) Prior Publication Data

US 2010/0156363 A1      Jun. 24, 2010

(30) Foreign Application Priority Data

Dec. 23, 2008   (TW) .............................. 97150293 A

(51) Int. Cl.
*G05F 1/40* (2006.01)
(52) U.S. Cl. ............................ 323/283; 323/268; 363/65
(58) Field of Classification Search ................ 323/222, 323/268, 225, 288, 299, 282–285, 906, 907; 363/16–19, 21.01, 37, 74, 56.01, 65, 87; 307/31, 38; 315/291, 224, 247, 312; 320/100, 320/121, 128, 137, 138
See application file for complete search history.

(56) References Cited

U.S. PATENT DOCUMENTS

| | | | | |
|---|---|---|---|---|
| 5,422,562 A | * | 6/1995 | Mammano et al. | 323/282 |
| 5,841,643 A | * | 11/1998 | Schenkel | 363/21.13 |
| 6,081,104 A | * | 6/2000 | Kern | 323/268 |
| 6,300,818 B1 | * | 10/2001 | Mao | 327/513 |
| 6,894,266 B2 | * | 5/2005 | Richard et al. | 250/214 R |
| 6,894,464 B2 | * | 5/2005 | Zhang | 323/268 |
| 7,558,083 B2 | * | 7/2009 | Schlecht | 363/21.06 |
| 7,710,047 B2 | * | 5/2010 | Shteynberg et al. | 315/291 |

FOREIGN PATENT DOCUMENTS

| CN | 101071955 A | 11/2007 |
|---|---|---|
| CN | 101162845 A | 4/2008 |

* cited by examiner

*Primary Examiner* — Rajnikant Patel
(74) *Attorney, Agent, or Firm* — Tung & Associates

(57) ABSTRACT

The present invention discloses a power system with temperature compensation control, for selectively supplying power from an external power source or a battery to a load, or charging the battery from the external power source, the power system comprising a buck converter electrically connected between the external power source and the load, and a temperature compensation control circuit for adjusting an output voltage of the buck converter according to a sensed temperature.

7 Claims, 4 Drawing Sheets

POWER SYSTEM WITH TEMPERATURE COMPENSATION CONTROL

BACKGROUND OF THE INVENTION

1. Field of Invention

The present invention relates to a power system with temperature compensation control.

2. Description of Related Art

Referring to FIG. 1, an electronic device often requires two power supply paths. When it is operated under an external power source, the external power source supplies power to a load 2 and charges a battery BATT; when the external power source does not exist, the battery BATT supplies power to the load 2. In the prior art shown in the drawing, the external power supply path is controlled by a linear voltage converter circuit 10. This linear voltage converter circuit 10 for example is a simple switch or an LDO (Low Drop-Out) circuit, including a power transistor switch P0 controlled by an LDO control circuit or a switch control circuit 11. The path through which the external power source charges the battery BATT and the battery BATT supplies power to the load 2 is controlled by a power transistor switch P1, wherein the switch P1 is controlled by a constant current or constant voltage (CC/CV) dynamic control circuit 20. The switch P1 is CC/CV dynamically controlled when the battery BATT is being charged, but operates as a simple switch when the battery BATT supplies power to the load 2.

In the foregoing prior art, the LDO 10 and the CC/CV dynamic control circuit 20 are well-know to a person skilled in this art, and their details are thus omitted here.

The foregoing prior art in FIG. 1 has the following drawback. Because the circuit uses the linear voltage converter circuit, the voltage difference between the external power source and the battery causes a heat dissipation issue. This issue occurs in either the power switch P0 or the power switch P1. Thus, it is desired to provide a solution to it.

SUMMARY OF THE INVENTION

In view of the foregoing drawback, the present invention provides a power system with temperature compensation control.

To achieve the foregoing objective, in one perspective of the present invention, it provides a power system with temperature compensation control, for selectively supplying power from an external power source or a battery to a load, or charging the battery from the external power source, the power system comprising: a buck converter electrically connected between the external power source and the load, and a temperature compensation control circuit for adjusting an output voltage of the buck converter according to a sensed temperature.

In a preferred embodiment of the foregoing circuit, the output voltage is preferably set within a range between an upper limit and a lower limit. The output voltage is allowed to reach the upper limit when the sensed temperature is lower than a predetermined temperature. A maximum level of the output voltage decreases as a temperature difference between the sensed temperature and the predetermined temperature increases, but the output voltage is still higher than or equal to the lower limit, when the sensed temperature is higher than the predetermined temperature.

The objectives, technical details, features, and effects of the present invention will be better understood with regard to the detailed description of the embodiments below, with reference to the drawings.

DESCRIPTION OF THE PREFERRED EMBODIMENTS

Figure 1:
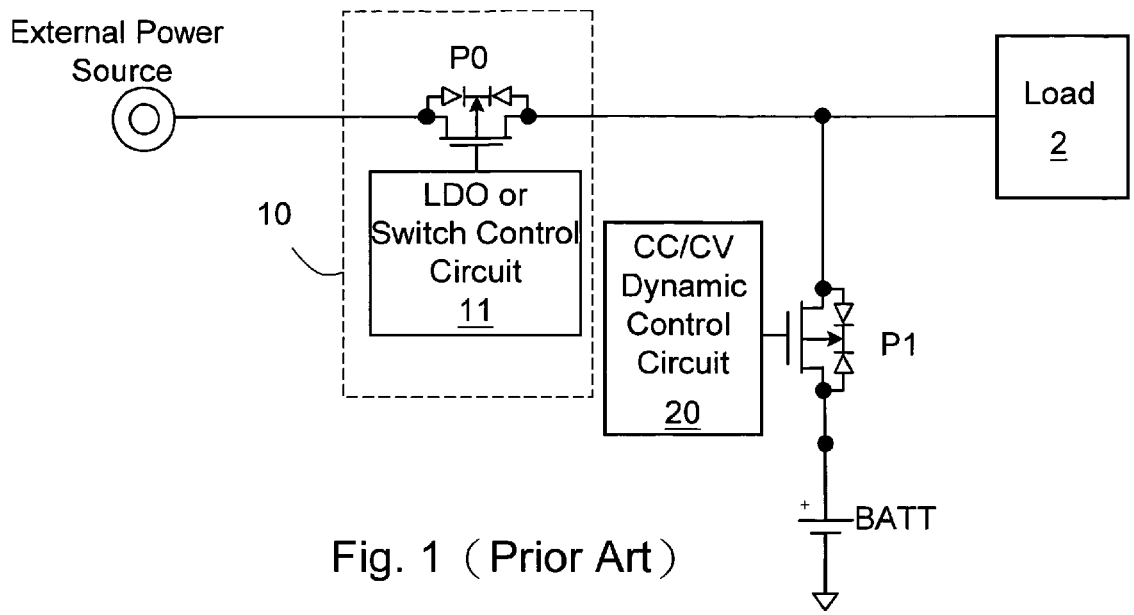
FIG. 1 is a schematic circuit diagram showing a prior art power system with two power supply paths.
Figure 2:
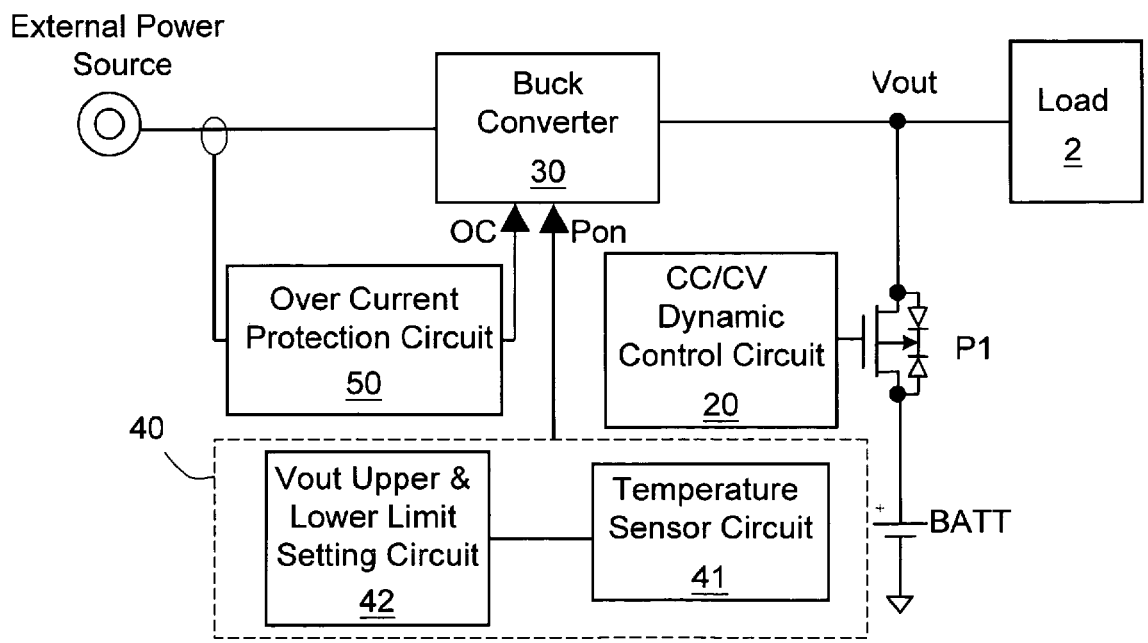
FIG. 2 is a schematic circuit diagram showing an embodiment of the present invention.

Please refer to FIG. 2, which shows an embodiment of the present invention by a schematic circuit diagram. The present invention employs a buck converter 30 to replace the linear voltage converter 10 in the prior art. The buck converter 30 has better power utilization efficiency and is less likely to cause heat dissipation issue. In addition, the buck converter 30 is operated under temperature compensation control so that the circuit temperature is even better controlled.

Figure 3:
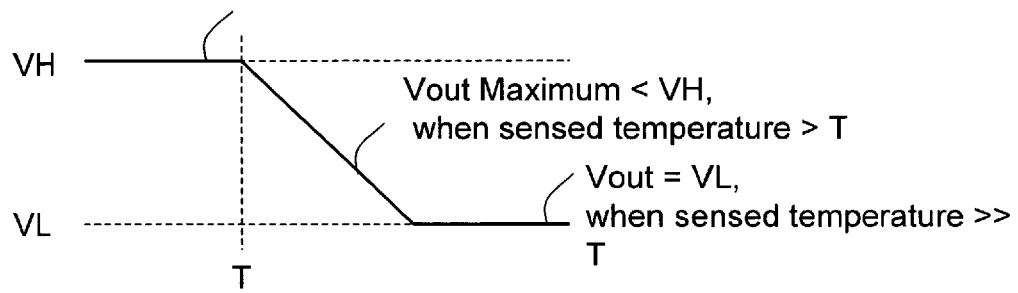
FIG. 3 illustrates the relationship between temperature and output voltage of the present invention.

More specifically, the power system of the present invention includes two power supply paths. The first power supply path is connected between an external power source and an output voltage node Vout which supplies an output to a load 2, the first power supply path being controlled by the buck converter 30. The second power supply path is connected between the output voltage node Vout and a battery BATT. The buck converter 30 is controlled by a temperature compensation control circuit 40, wherein the temperature compensation control circuit 40 includes a temperature sensor circuit 41 and an output voltage upper and lower limit setting circuit 42. The temperature sensor circuit 41 senses the circuit temperature. When the circuit temperature is too high, the output voltage Vout is adjusted to reduce the circuit temperature. The output voltage upper and lower limit setting circuit 42 sets an upper limit VH and a lower limit VL of the output voltage Vout. Referring to FIG. 3, the function achieved by the temperature sensor circuit 41 and the output voltage upper and lower limit setting circuit 42 is thus. When a sensed temperature is lower than a predetermined temperature T, the output voltage is allowed to reach the upper limit VH, such that the load 2 and the battery BATT can obtain a maximum level of power. When the sensed temperature is equal to or higher than the predetermined temperature, the maximum level of the output voltage Vout decreases gradually to reduce the circuit temperature. Yet, when the sensed temperature is much higher than the predetermined temperature T, the output voltage Vout is still not lower than the lower limit VL, such that the load 2 can obtain the basic power that it requires.

In addition, in this embodiment, an additional over current protection circuit 50 may be optionally provided. The over current protection circuit 50 is used for controlling current through the first power supply path, such that the current does not exceed a predetermined safety range.

Figure 4:
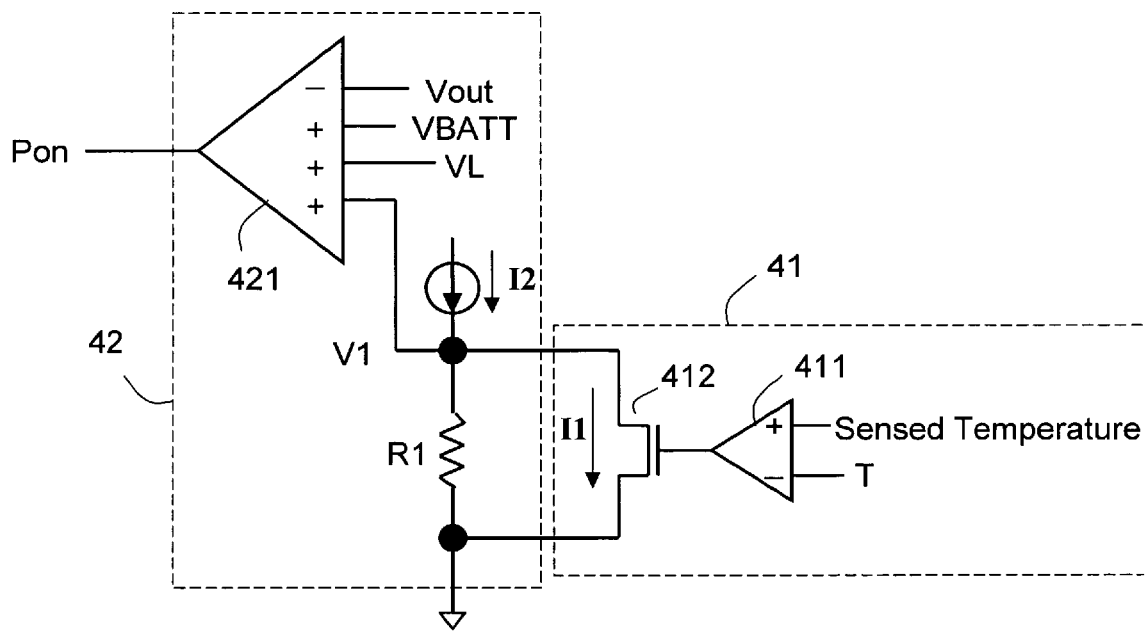
FIG. 4 is a schematic circuit diagram illustrating embodiments of a temperature sensor circuit and an output voltage upper and lower limit setting circuit.

FIG. 4 shows a specific embodiment of the temperature compensation control circuit 40. The temperature sensor circuit 41 includes an operational amplifier 411 and a transistor 412, wherein the operational amplifier 411 has an output controlling a gate of the transistor 412. The operational amplifier 411 compares a signal representing a sensed temperature with a signal representing a predetermined temperature T, and controls the conduction of the transistor 412 to determine a current I1 according to the comparison result. The output voltage upper and lower limit setting circuit 42 includes a current source 12, a resistor R1 and a comparator 421, wherein the product of the current I2 and the resistance R1 is equal to the upper limit VH of the output voltage. When the sensed temperature is lower than the predetermined temperature T, the operational amplifier 411 controls the transistor 412 and turns it off; hence, I1 is zero. Therefore, the voltage at the node V1 is equal to I2×R1 (i.e., VH is equal to I2×R1). When the sensed temperature is higher than the predetermined temperature T, the conduction of the transistor 412 increases in accordance with the increase of the temperature difference. In this case, the voltage at the node V1 is equal to (I2−I1)×R1. The comparator 421 selects a highest one from its three positive inputs, i.e., the battery voltage VBATT, the lower limit VL, and the node voltage V1, and compares it with the output voltage Vout. When the comparison result shows that the negative input (output voltage Vout) is lower, a high level signal Pon is generated.

When the over current protection circuit 50 is provided and the temperature compensation control circuit 40 is embodied by the one shown in FIG. 4, the circuit can supply power to the load in the following way, for example:

First, when an over current protection is not triggered, and when the sensed temperature is much lower than the predetermined temperature T, the output voltage Vout can be set to the upper limit VH. When the sensed temperature exceeds but is still close to the predetermined temperature T, the maximum level of the output voltage Vout decreases, such that the voltage difference between the output voltage Vout and the battery BATT decreases. Hence, power dissipation by the power transistor P1 decreases, so that the circuit temperature decreases and eventually balances at the predetermined temperature T. When the sensed temperature is far higher than the predetermined temperature T, if the battery voltage VBATT is higher than the lower limit VL, the maximum level of the output voltage Vout is VBATT, such that the voltage difference of the output voltage Vout and the battery voltage VBATT is zero; hence, the power dissipation by the power transistor P1 is zero. Yet, if the battery voltage VBATT is lower than the lower limit VL, the output voltage Vout is maintained at the lower limit VL, such that the load 2 can obtain basic power that it requires.

Second, when the total current flowing to the load 2 and for charging the battery BATT is too large that the over current protection circuit 42 is triggered, because the product of the input current and input voltage of the buck converter 30 is almost equal to the product of its output current and output voltage, when the input current is limited and the output current increases, the output voltage Vout naturally decreases, such that the power transistor P1 enters its saturation region, and the current charging the battery BATT decreases accordingly. If the current required by the load 2 is more than the over current protection setting, the circuit will stop charging the battery BATT; instead, the external power source and the battery BATT will both supply current to the load 2.

Figure 5:
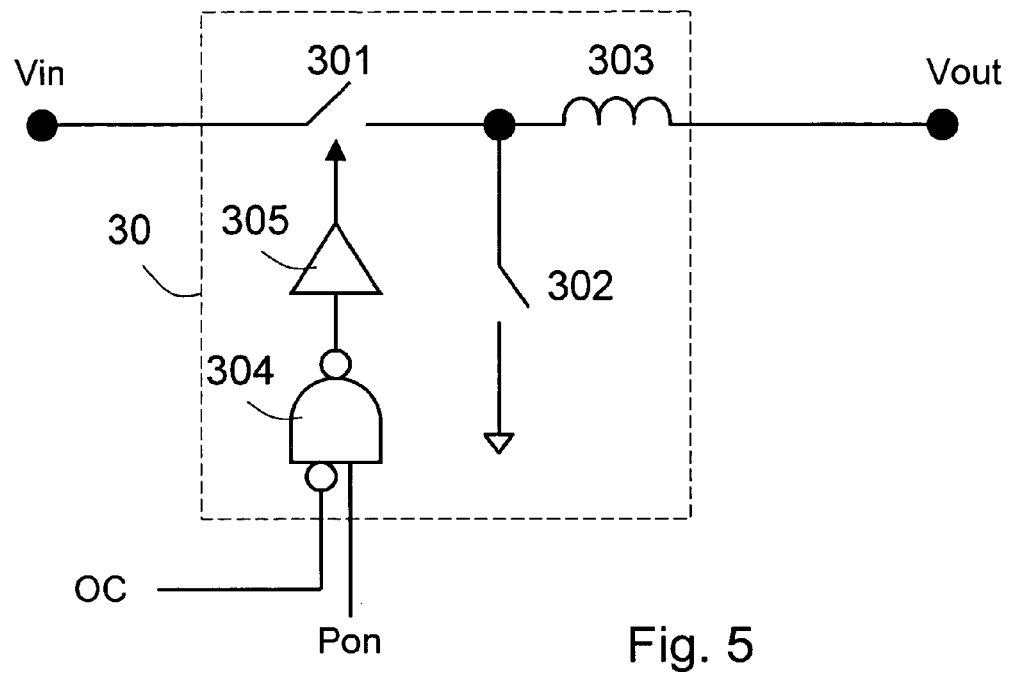
FIG. 5 shows how to control a buck converter according to an output of a temperature compensation control circuit and an over current protection circuit.

When the over current protection circuit 50 is not provided, the output signal Pon of the temperature compensation control circuit 40 can solely determine the switching time of a power switch in the buck converter 30. If the over current protection circuit 50 is provided, as an example, the circuit may be embodied as shown in FIG. 5. The buck converter 30 includes upper and lower gate power switches 301 and 302, and an inductor 303. By operation of the upper and lower gate power switches 301 and 302, an input voltage Vin at the left side is converted to an output voltage Vout at the right side. Each of the upper and lower gate power switches 301 and 302 can be a PMOS transistor or an NMOS transistor. Depending on the type of the transistor, the gate control signal thereof may need to be inverted. A logic circuit 304 performs a logic operation on the output signal Pon from the temperature compensation control circuit 40 and the output signal OC from the over current protection circuit 50; the result is used to drive the power switch 301 via a driver gate 305. Assuming that the upper gate power switch 301 is a PMOS transistor, when the output signal OC is low, indicating that the over current status does not occur, the signal Pon determines the on-time of the power switch 301 (since the power switch 301 is a PMOS transistor, the logic circuit 304 outputs the signal Pon in inverted form). When the output signal OC is high, indicating that the over current status occurs, the logic circuit 304 outputs a high level signal, and the power switch 301 is turned off.

Figure 6:
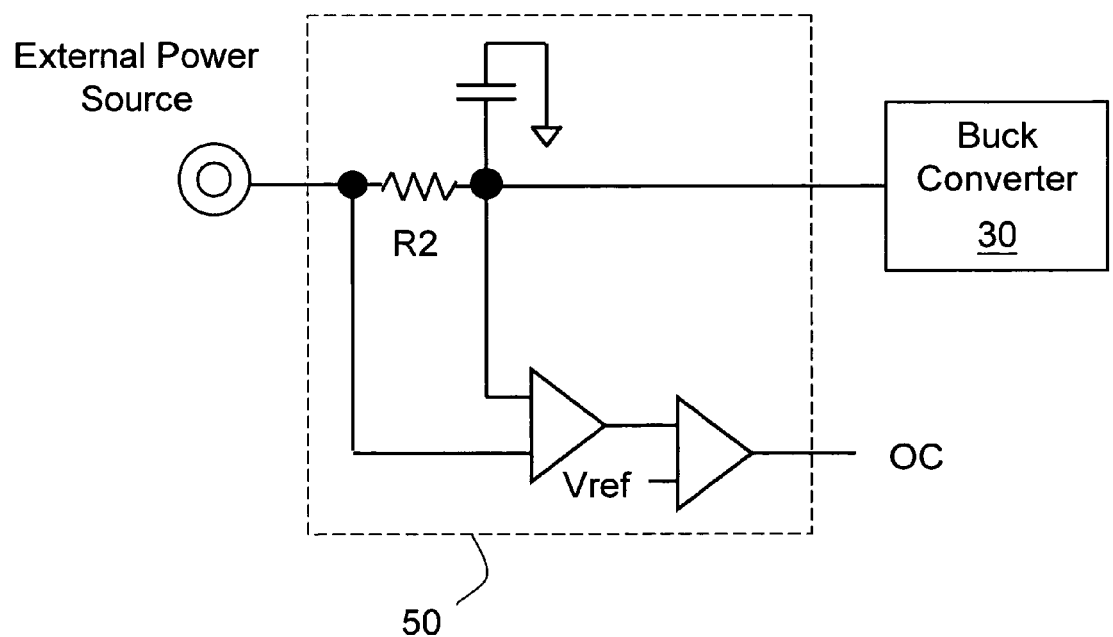
FIGS. 6-7 illustrate two embodiments of the over current protection circuit.
Figure 7:
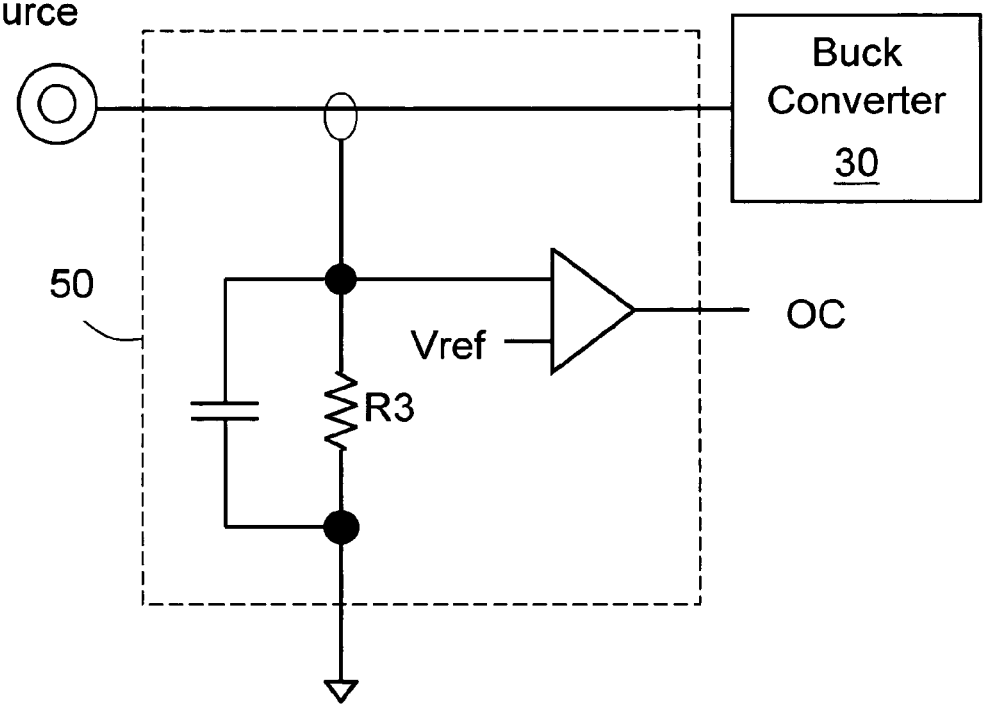

The over current protection circuit 50 can be embodied in many forms. FIG. 6 shows one example thereof, wherein a voltage difference across the resistor R2 is used to indicate a current flowing through the resistor R2. By comparing the voltage difference with a predetermined reference voltage Vref, it can be determined whether an over current status has occurred. FIG. 7 shows another example of the over current protection circuit 50, wherein it senses a current flowing through the first power supply path, and causes the current to flow through a resistor R3. Similarly, whether an over current status has occurred can be determined by comparing the voltage across the resistor R3 with the reference voltage Vref.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the power switch 302 can be replaced by a diode. As another example, an additional circuit device which does not substantially affect the primary function of the circuit can be interposed between two devices shown to be in direct connection in the embodiments of the present invention. As yet another example, in the embodiment shown in FIG. 4, it is not necessarily required to compare all signals in one comparator 421; instead, the signals can be compared two by two, and the results are consolidated by logic operation, or the like. In view of the foregoing, the spirit of the present invention should cover all such and other modifications and variations, which should be interpreted to fall within the scope of the following claims and their equivalents.

What is claimed is:

1. A power system with temperature compensation control, for selectively supplying power from an external power source or a battery to a load, or charging the battery from the external power source, the power system comprising:
   a buck converter electrically connected between the external power source and the load, and
   a temperature compensation control circuit for adjusting an output voltage of the buck converter according to a sensed temperature;
   wherein the output voltage is set within a range between an upper limit and a lower limit, the output voltage being allowed to reach the upper limit when the sensed temperature is lower than a predetermined temperature, and the output voltage being higher than or equal to the lower limit but not allowed to reach the upper limit when the sensed temperature is higher than the predetermined temperature; and wherein when the sensed temperature is higher than the predetermined temperature, a maximum level of the output voltage decreases as a temperature difference between the sensed temperature and the predetermined temperature increases.

2. The power system of claim 1, wherein the temperature compensation control circuit includes:

a temperature sensor circuit comparing a signal representing the sensed temperature and a signal representing a predetermined temperature;

an output voltage upper and lower limit setting circuit setting an upper limit and a lower limit of the output voltage and adjusting a maximum level of the output voltage according to a temperature difference between the sensed temperature and the predetermined temperature.

3. The power system of claim 2, wherein the temperature sensor circuit includes an operational amplifier controlling a transistor to generate a first current according to the comparison between the signal representing the sensed temperature and the signal representing the predetermined temperature; and wherein the output voltage upper and lower limit setting circuit includes a current source which generates a second current flowing through a resistor, a voltage across the resistor varies in accordance with a difference between the second current and the first current.

4. The power system of claim 3, wherein the output voltage upper and lower limit setting circuit further includes a comparator comparing a signal representing an output voltage of the buck converter with the voltage across the resistor.

5. The power system of claim 4, wherein the comparator is a multiple input comparator including three positive inputs receiving signals representing a battery voltage, the voltage across the resistor, and the lower limit of the output voltage respectively, and a negative input receiving a signal representing the output voltage of the buck converter, wherein the multiple input comparator compares a highest one among the positive inputs with the negative input.

6. The power system of claim 1, further comprising an over current protection circuit to prevent the buck converter from receiving an over current.

7. The power system of claim 6, wherein the buck converter includes:

an upper gate power switch, a lower gate power switch, and an inductor which are coupled to a common node; and a logic circuit receiving output signals from the temperature compensation control circuit and the over current protection circuit, wherein when the output signal of the over current protection circuit does not indicate an over current status, the upper gate power switch is controlled by the output signal of the temperature compensation control circuit; when it indicates the over current status, the upper gate power switch is kept OFF.

* * * * *